(No Model.)
P. M. HINMAN & J. B. THOMPSON.
ICE CREAM FREEZER.
No. 475,240. Patented May 17, 1892.
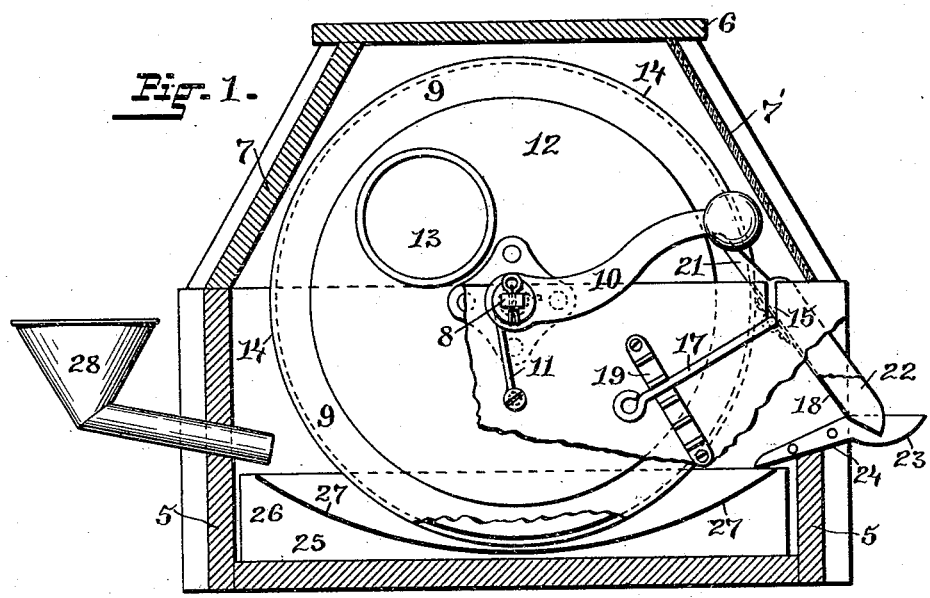
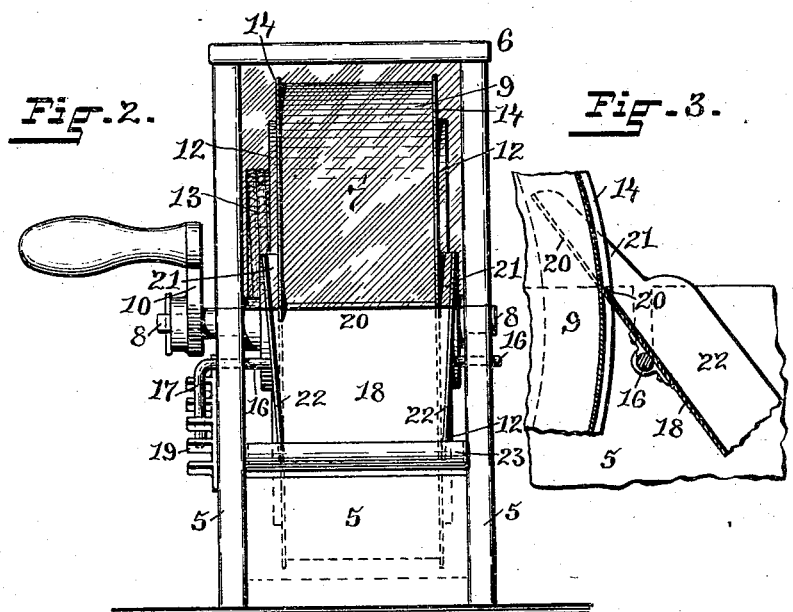
WITNESSES:
J. L. Seymour
Henry J. Miller
INVENTORS
Portus M. Hinman
Joseph B. Thompson
By Joseph A. Miller & Co.
Att'ys

UNITED STATES PATENT OFFICE.

PORTUS M. HINMAN, OF ROCHESTER, NEW YORK, AND JOSEPH B. THOMPSON, OF PROVIDENCE, ASSIGNORS, BY DIRECT AND MESNE ASSIGNMENTS, TO SAID THOMPSON AND WILBUR F. SMITH, OF PROVIDENCE, RHODE ISLAND.

ICE-CREAM FREEZER.

SPECIFICATION forming part of Letters Patent No. 475,240, dated May 17, 1892.

Application filed August 29, 1891. Serial No. 404,102. (No model.)

*To all whom it may concern:*

Be it known that we, PORTUS M. HINMAN, of Rochester, in the county of Monroe and State of New York, and JOSEPH B. THOMPSON, of Providence, in the county of Providence and State of Rhode Island, have invented certain new and useful Improvements in Ice-Cream Freezers; and we hereby declare that the following is a full, clear, and exact description of the same, reference being had to the accompanying drawings, forming part of this specification.

This invention has reference to improvements in that class of ice-cream freezers in which a layer of cream and other ingredients are taken up on the circumference of a cylinder passing through a receptacle and are frozen by a freezing-mixture held in said cylinder, from the surface of which the frozen cream is removed by scrapers.

The objects of this invention are to produce a freezer which will freeze the cream in a shorter time and in which a small quantity may be frozen at one time.

The further object is to produce a cylinder and a scraper acting on such cylinder to remove all the cream adhering to the surface thereof.

The invention consists in the peculiar construction of the various parts and their novel combination with one another to form a complete freezer and delivering device, as will be more fully described hereinafter, and pointed out in the claim.

Figure 1 is a side view of the freezer, portions of the case being broken away to show the inner construction and indicate the operation. Fig. 2 is an end view of the same, portions of the interior mechanism being seen through the glass panel. Fig. 3 is a sectional view of portions of the scraper and of the cylinder and their relative positions.

Similar numbers of reference designate corresponding parts throughout.

In the drawings, 5 indicates a case made of wood or other suitable material, that which is a poor conductor of heat being preferred.

6 is the cover of the case 5 and has sloping ends 7 and 7', one or both of which may be formed of glass or panels of glass inclosed in in wooden frames.

Near the center of the sides of the case 5 bearings are formed in which the shaft 8, passing through and secured to the hollow cylinder 9, is journaled, one end of this shaft being shaped to fit a socket or perforation in the removable handle crank 10, and pivoted to one or both sides of the case 5 are hooks 11 for holding the shaft 8 in its bearings.

The hollow cylinder 9 may be made of tin or enameled iron, but is preferably formed of stoneware or a common quality of china in order to retain for as long a time as possible the low temperature created by the freezing-mixture, and as an extra precaution we secure the insulating disks 12 one on each side of the cylinder. These disks are made of a material which is a poor conductor of heat and are of such size as will not extend near enough to the circumferential edges of the cylinder to take up any of the mixture through which these edges may pass. In one side of this cylinder 9 is formed an opening 13, which is covered by a screw-cap, through which the freezing-mixture may be inserted or withdrawn from the cylinder. The circumferential edges of the cylinder are shaped to form flanges 14 14, the space between which forms a channel around the circumference of the cylinder.

In the forward portion of the sides of the case 5 bearings 15 are formed, in which is journaled a small shaft 16, having the arm 17 bent at right angles therewith, and to this shaft is rigidly secured the adjustable chute 18, the arm 17 being adapted to engage with the rack 19, secured to the side of the case 5. The chute 18 is formed of metal and has the scraping-blade 20, extending across the surface of the cylinder and fitting between the flanges 14 14, and the ears 21 21, extending inward and close to the sides of the cylinder, the metal forming the chute 18 is bent upward at the sides 22 22.

Below the chute 18 we sometimes secure a receptacle 23, formed of sheet metal and having an apron 24 extending backward to the pan 25, over which any unfrozen mixture may be returned to said pan. The pan 25 is formed of two side pieces 26, of metal, between which is secured the curved piece 27, forming the bottom and ends of the pan, the radius of this curved bottom being but slightly greater than that of the circumference of the cylinder 9, so that when a small portion of mixture is held in this pan it will be held in a position to be taken up by the cylinder, the mixture being introduced into the pan through the funnel 28, the pipe of which extends through the rear of the case 5. The cylinder 9 and the shaft 8 may be removed from the case 5. The cylinder is filled with the freezing compound through the opening 13, which is then closed, the cylinder being returned to its case and the hooks 11 turned over the shaft 8 to hold it in its bearings. Any suitable mixture desired to be frozen is poured through the funnel 28 into the pan and the cylinder revolved by the handle-crank 10. As the circumference of the cylinder passes through the mixture a layer of the same will adhere to the surface of the cylinder between the flanges 14 14 and to a portion of the sides of the cylinder. When this layer of cream which has been frozen to the surface of the cylinder meets the blade 20, previously adjusted, it will be scraped off the cylinder between the flanges, while the scraping-ears 22 22 will remove the frozen mixture from the sides of the cylinder. This frozen mixture will be gradually forced down the chute into the receptacle 23, and any unfrozen portion will run back over the apron 24 into the pan 25. In place of the receptacle 23 we sometimes extend the apron 24 in an incline from the edge of the pan 25 to a point slightly in front of the lower edge of the chute. By the use of the chute, adjusted by means of the bent arm 17 and rack 19, the action of the blade 20 on the surface of the cylinder may be varied and the cylinder may be revolved several times, taking up successive layers of cream before the scraper is applied the glass panel 7', enabling the operator to watch the process of freezing without opening the case.

Having thus described our invention, we claim as new and desire to secure by Letters Patent—

In an ice-cream freezer of the nature described, the combination, with a cylinder containing a freezing compound and revolving through a mixture to be frozen and a pan for containing such mixture, of a scraper pressing against and adapted to remove the frozen mixture from the surface of the cylinder and a return-apron secured immediately below the scraper, over which any unfrozen mixture may be returned to a point where it can again be taken up by the cylinder, as described.

PORTUS M. HINMAN.
JOSEPH B. THOMPSON.

Witnesses as to the signature of Portus M. Hinman:
WM. R. MUDGE,
GEO. W. LAMB.

Witnesses as to the signature of Joseph B. Thompson:
HENRY J. MILLER,
JOSEPH A. MILLER, Jr.